United States Patent [19]

Yee

[11] Patent Number: 5,489,748
[45] Date of Patent: Feb. 6, 1996

[54] METHOD AND APPARATUS FOR POSITIONING ELECTRICAL CONDUCTORS

[76] Inventor: Ping C. Yee, 1822 Sierra Alta, Monterey Park, Calif. 91754

[21] Appl. No.: 65,712

[22] Filed: May 24, 1993

[51] Int. Cl.$^6$ ........................................... H01B 17/29
[52] U.S. Cl. ................... 174/174; 174/52.1; 29/892
[58] Field of Search ................... 174/174, 152 G, 174/138 G, 152 GM, 153 G, 138 H, 138 J, 50.52, 50.5, 50.59, 150, 151, 52.1; 439/733, 744; 29/868, 872, 873

[56] References Cited

U.S. PATENT DOCUMENTS

| | | | |
|---|---|---|---|
| 3,325,770 | 6/1967 | Hammell et al. | 439/733 |
| 3,538,596 | 11/1970 | Davis et al. | 29/872 X |
| 3,739,470 | 6/1973 | Eppler | 29/872 |
| 4,577,259 | 3/1986 | Latasiewicz et al. | 174/138 G X |
| 4,941,069 | 7/1990 | Danenberg et al. | 174/138 G X |
| 4,955,827 | 9/1990 | Roy et al. | 439/744 X |
| 4,976,796 | 12/1990 | Feitzelmayer | 29/868 X |
| 4,986,772 | 1/1991 | Fukutani | 74/138 G X |
| 5,184,894 | 2/1993 | Falk et al. | 374/140 |
| 5,186,662 | 2/1993 | Yuasa et al. | 439/752 |

*Primary Examiner*—Laura Thomas

[57] ABSTRACT

Apparatus for holding electrical conductors which includes a body having one or more bores for receiving electrical conductors. Each bore has an axial section having a non-circular cross-section. The bores may be disposed in substantially parallel relationship. Each of the bores may includes a counterbore at one axial extremity thereof to provide space for a weld between electrical conductors disposed in that bore and a chamber at the axial extremity thereof opposite to the axial extremity at which the counter bore is disposed.

The invention also includes the method of assembling an assembly having first and second sets of wires or individual conductors that are to be secured together and then held respectively apart thereafter. In the case of the sets the method includes providing a first set of wires having at least first and second conductors, providing a second set of wires having at least first and second conductors, and providing an electrically non-conductive body having at least first and second bores therein. The method also includes inserting the first wire from the first set and the first wire from the second set in the first bore and securing the first conductors together and inserting the second conductor of the first set and the second conductor of the second set in the second bore and securing the second conductors together. The method further includes installing the first and second sets of conductors and the non-conductive body into a higher assembly which may be an elongated tube.

23 Claims, 2 Drawing Sheets

METHOD AND APPARATUS FOR POSITIONING ELECTRICAL CONDUCTORS

BACKGROUND OF THE INVENTION

The invention relates to electrical apparatus and the positioning of electrical conductors. The positioning of electrical conductors includes (1) securing electrical conductors to prevent twisting and (2) securing electrical conductors to ease the assembly of electrical conductors and holding the assembled conductors spaced from other conductors and objects.

One application of the invention is in the connection of multiple sets of multiple conductors. It is common to connect a first set of first and second conductors to respectively first and second conductors in a second set of electrical conductors. This is, of course, routinely done with temperature sensors, electric light bulbs, motors and a multitude of other apparatus. While the present invention has particular application to temperature probe for use in an oven, it will be understood that it also has application to other apparatus. In a typical application, the first wire of a first set of first and second wires are secured by welding, brazing or soldering to the first wire of a second set of first and second wires by manually holding or securing the wires involved in a fixture. After that the second wire in the first set is secured to the second wire in the second set again by manually holding or securing the wires in a fixture. Commonly, additional structure that may be merely a sleeve of insulating material is provided to maintain the first wires of each set in spaced relationship from the second wires in the first and second sets. The positioning of the wires in fixtures during assembly and then moving them into other structure, which will maintain them in spaced relationship throughout the life of the assembly, is time consuming and expensive.

Another problem is the tendency of electrical conductors to twist and fracture. The problem is particularly acute with but not limited to foil or ribbon shaped conductors.

The prior art includes U.S. Pat. No. 4,864,184 relating to a lamp construction and a method of manufacture. The halogen lamp shown therein includes a sealed envelope of vitreous material and a lamp base that is typically a ceramic base for holding the lamp capsule. A filament is disposed within the lamp capsule and has first and second conductors that extend from the interior of the capsule. The capsule includes a press-seal that is substantially flat in which are disposed respective molybdenum foil strips extending from the respective extremities of the filament. The respective ends of the foil strips are connected to individual lead wires that extend through a quantity of cement disposed in a cup shaped ceramic base. The manner of assembly shown involves securing the respective foil conductors to the respective lead wires and then inserting the connected conductors through spaced apart holes in a ceramic base. After that, cement is placed within the ceramic base to secure the assembly together. Thus the ceramic base does not position the respective sets of conductors while they are being secured together.

In addition, the foil strips are clamped in the press-seal. The use of such a press-seal does prevent twisting of the foil strips. This approach is not, however, practical for most manufacturing operations because of the difficulty of working with molten glass or quartz.

Another problem with the prior art apparatus is that it often does not properly orient the respective electrical conductors for good contact.

SUMMARY AND OBJECTS OF THE INVENTION

It is a primary object of the invention to provide a method and apparatus for positioning a conductor and that will support a conductor in a way that will prevent twisting.

It is an object of the invention to provide apparatus that will hold respective sets or pairs of electrical conductors while they are being secured and maintain respective sets in spaced relationship after they are secured.

It is another object of the invention to minimize assembly time and apparatus having respective sets of electric conductors where each set includes at least first and second conductors.

It is still another object of the invention to provide apparatus that is both a fixture during assembly and part of the ultimate assembly.

It is yet another object of the invention to provide apparatus that will properly orient foil shaped conductors for good contact with another conductor.

It has now been found that these and other objects of the invention may be attained in an apparatus for holding electrical conductors which includes a body having first and second bores wherein the bores are spaced apart and each has an axial section having a non-circular cross-section. The apparatus includes means to lock at least one associated electrical conductor in the respective bores.

In some forms of the invention each of axial sections are at respective first axial extremities of respective bores and the bores are disposed in substantially parallel relationship. Each of first axial extremities may be dimensioned and configured to provide space for a filler material between one or more electrical conductors disposed in first axial extremity of bore and the wall of the first axial extremity. The first axial extremities may be a counterbore. and each of the bores may include a chamfer at a second axial extremity thereof opposite to the first axial extremity at which counter bore is disposed. The body has an outer contour that is cylindrically section shaped. A lip shaped member may extend axially from the generally cylindrical body.

The invention also includes the method of assembling an assembly having first and second sets of wires that are to be secured together and then held respectively apart thereafter which includes providing a first set of wires having at least first and second conductors, providing a second set of wires having at least first and second conductors, and providing an electrically nonconductive body having at least first and second bores therein that have at least axial sections that have non-circular cross-section. The method also includes inserting the first wire from the first set and the first wire from the second set in axial section of first bore and inserting a filler material in axial section of first bore to secure first wire of first set and first wire of second set together. The method also includes inserting second wire of first set and second wire of second set in axial section of second bore and inserting a filler material in axial section of second bore to secure second conductors together.

In some forms of the method includes installing first and second sets of conductors and non-conductive body into a higher assembly that may be an elongated tube. The filler material may be provided by a welding step at axial sections disposed at respective axial extremities of respective bores.

The apparatus for holding an electrical conductor may be merely a body having a bore extending therein and the bore has at least a first axial section that has a non-circular cross-section. Each of the first axial sections may be disposed at respective first axial extremities of bores. Each of the bores may include a first axial section dimensioned and configured to provide space for a weld between electrical conductors disposed in that bore. The first axial section may be a counterbore wherein bore includes a chamfer at the axial extremity thereof opposite to the first axial extremity at which counter bore is disposed and body has an outer contour that is cylindrically section shaped. The apparatus may have a lip shaped member extending axially from generally cylindrical body.

The invention also includes a method of assembling an assembly having first and second wires that are to be secured together and then held respectively apart thereafter which includes providing a first wire, providing a second wire; providing an electrically non-conductive body having at least first and second bores therein; inserting the first wire and the second wire in the bore and securing the wires together by adding a filler material intermediate the wires and the first axial extremity; and installing the first and second wires and the non-conductive body into a higher assembly.

BRIEF DESCRIPTION OF THE DRAWINGS

The invention will be better understood by reference to the accompanying drawing in which.

DESCRIPTION OF THE PREFERRED EMBODIMENT

Referring now to FIGS. 1–9, there is shown a first embodiment of the apparatus according to one form of the invention. The complete thermal sensor assembly 10 includes first and second termination wires 12, 14 that extend from an elongated tube 16. The tube 16 has a flattened end that is on the left as viewed in FIG. 1. This end limits movement of components within the tube 16.

Figure 2:
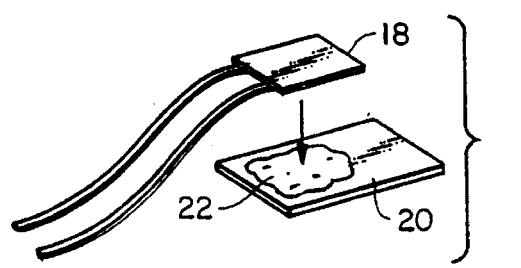
FIG. 2 is an exploded perspective view of a temperature sensing chip that is to be secured to a substrate.

Disposed within the tube 16 is a positive temperature coefficient chip 18 that is affixed to substrate 20. The substrate 20 ordinarily is manufactured of alumina. As best shown in FIG. 2, the two are secured together by an adhesive 22.

Figure 4:
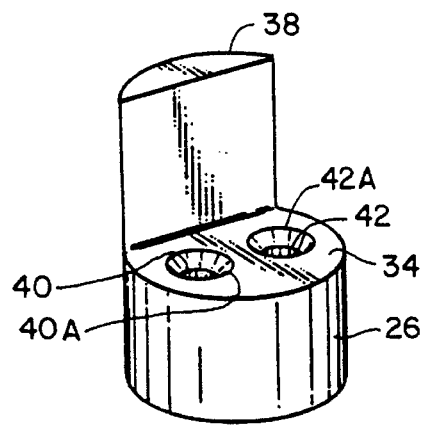
FIG. 4 is a perspective view of one form of the spacer/fixture member according to the present invention.
Figure 5:
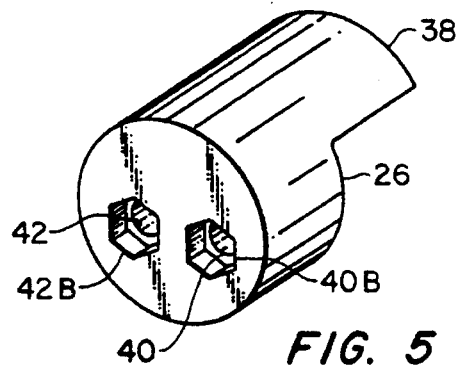
FIG. 5 is another perspective view of the spacer/fixture shown in FIG. 4.
Figure 6:
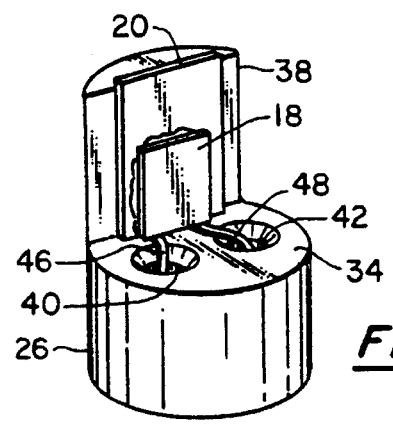
FIG. 6 is still another perspective view showing the spacer, sensor and substrate assembled.
Figure 10:
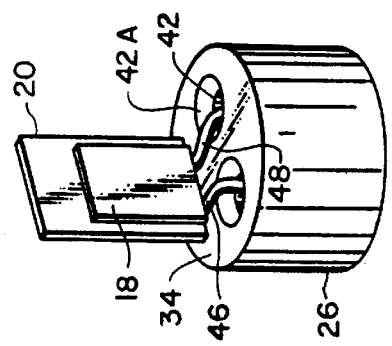
FIG. 10 is perspective view of an alternative embodiment of the invention that differs from the structure shown in FIGS. 4–8 that does not include the axially aligned shoulder.

The thermal sensor assembly 10 also includes a generally cylindrical member or spacer/fixture 26. The generally cylindrical member 26 functions as both a fixture during assembly of the thermal sensor assembly 10 and also as a positioning device for the respective conductors after assembly of the sensor assembly 10. As best seen in FIGS. 4,5,6 the generally cylindrical member 26 is a cylindrical section have mutually parallel end faces 34, 35. The upper face 34 in this embodiment does not extend completely through the cylindrical section. More particularly, an axially extending step or lip 38 has an outer face which is a portion of the same cylindrical section as the main body and a generally planar inner face which is disposed in perpendicular relationship to a radius extending from the center of curvature of the cylindrical section. (In the alternative embodiment illustrated in FIG. 10, the upper face 34 does extend completely through the cylindrical member 26) and there is no lip 38.

The cylindrical section of the cylindrical member 26 is provided with first and second bores 40, 42 that extend from the upper or first generally planar face 34 to the bottom or second generally planar face 35. Advantageously, particularly where foil or ribbon shaped electrical conductors are utilized, the cross section of the respective counterbores 40B, 42B is non-cylindrical. More particularly, in the preferred embodiment, the cross section of each of the respective counterbores 40B, 42B are hexagonal although it will be understood that other non-cylindrical shapes such as squares, rectangles, pentagons or other shapes would be advantageous. For example, the cross section might be a combination of a line and an arc. In other words the bore may be, for example, a combination of an axially extending plane and an axially extending cylindrical section shaped bore.

In the preferred embodiment, the respective bores 40, 42 at the intersection with the upper (as viewed in FIGS. 7–9) face 34 of the cylindrical section 26 are provided with respective chamfers 40A, 42A. At the intersection between the bores 40, 42 and the lower, (as viewed in FIGS. 7–9) face 35, the bores 40, 42 are provided with respective counterbores 40B, 42B.

Figure 3:
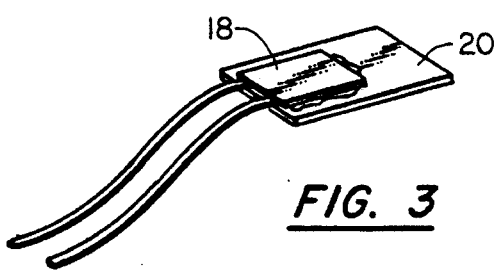
FIG. 3 is a perspective view showing the chip and substrate assembled.
Figure 9:
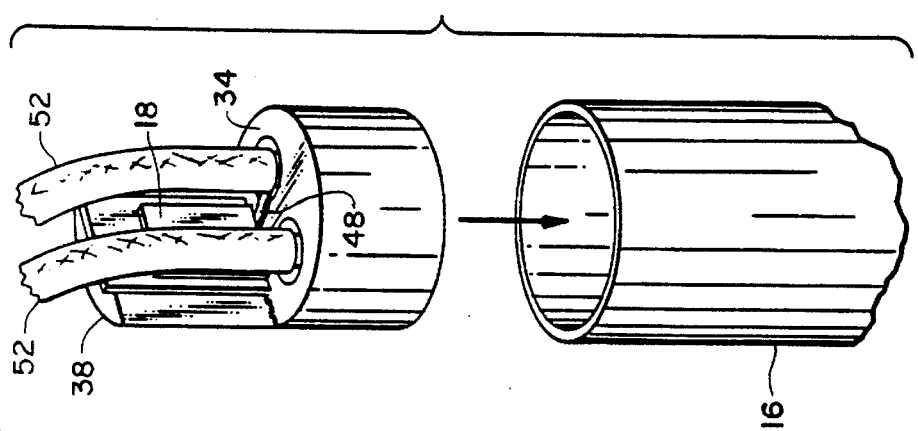
FIG. 9 is an exploded view showing the manner in which the apparatus in FIG. 8 is assembled into a tube as part of the assembly of the apparatus shown in FIG. 1.
Figure 8:
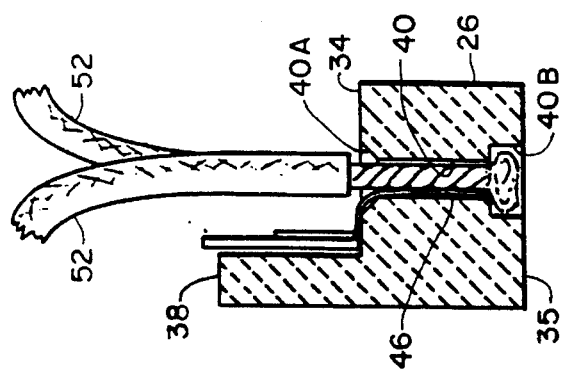
FIG. 8 is a view similar to FIG. 7 showing the assembled apparatus after the foil conductor and lead wire have been welded together.
Figure 7:
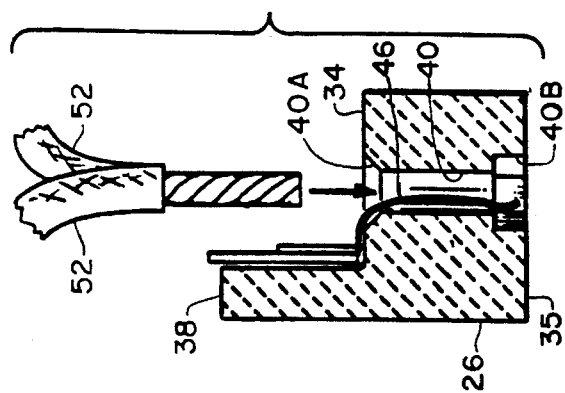
FIG. 7 is an exploded view showing in cross section a foil conductor disposed within the spacer/fixture and illustrates the manner in which another conductor is inserted into the hole in the spacer/fixture.

The generally cylindrical member 26 functions as a fixture during assembly. More particularly the combination of the substrate in the chip shown in FIGS. 2 and 3 are installed with the substrate in planar face to planar face abutting engagement against the lip 38 of the generally planar member 26 with the foil conductors extending therefrom through the respective bores 40, 42. After that as shown in FIG. 6, a braided wire 52 is inserted into each bore 40, 42 as shown in FIGS. 7, 8 and 9 are welded in place. Typically, the respective respective welds fill the volume of the counterbores 40B, 42B at the lower axial extremity of the respective bores 40, 42.

Figure 1:
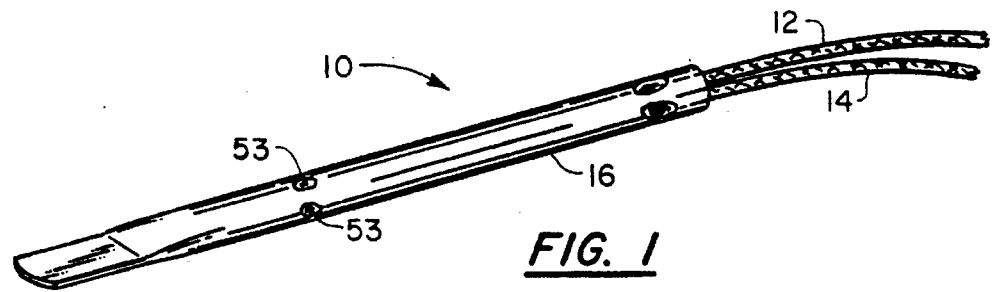
FIG. 1 is an assembled temperature probe for use in an oven.

Thereafter, the generally cylindrical member 26 together with the positive temperature coefficient element 18 on the substrate 20 are positioned in the tube 16 near the left (as seen in FIG. 1) axial extremity thereof and crimps 53, 53 are placed in the tube 16 to secure the assembly together.

The description above has focused on the attachment of sets of wires. It will be seen that the invention prevents twisting of individual conductors as well as the two separate conductors that may be joined at a single junction point. For example, the invention in the broadest form prevents the twisting of only a single conductor that extends into a passageway in a body that has a non-circular cross-section.

The axial portion of the conductor in the body is secured in the body by welding or other techniques. The method of securing may be by melting of the conductor as in welding or using some other filler such as a brazing material, a solder or even an epoxy. For the sake of simplicity in describing the invention the melted conductor that results when the conductor is exposed to arc or gas welding techniques will be considered as a filler material although welding by definition does not add any other material. It is the "filler material" that fills the non-circular cross-section of the passageway in the body. The non-circular cross-section of the filler material is fixed to the conductor and locked to the passageway because it completely fills the non-circular passageway. Accordingly, the conductor cannot turn.

In various forms of the invention more than one conductor may be locked in the passageway, the body may secure the conductors both as an assembly fixture and as part of the ultimate assembly, one or more of the conductors may be foil or ribbon shaped, the passageway may be a counterbore that is axially aligned with another passageway. The non-circular cross-section may be any of various shapes as long as it is not circular. The circular cross-section is not satisfactory because the conductor will not be locked to the passageway. In other words the filler material can rotate in a circular passageway. Such rotation would twist the conductor.

Those skilled in the art will recognize that the invention has application to electrical conductors that are formed with a singe wire as well as a plurality of wires that are disposed in parallel side abutting relationship such as that used in ordinary lamp cord.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described by invention, I claim:

1. Apparatus for holding electrical conductors which comprises:

a body having first and second bores, said bores being spaced apart and each has an axial section having a non-circular cross-section;

and means for locking respective associated electrical conductors with respect to said body in each of said axial sections of said bores, each of said axial sections being at respective first axial extremities of respective bores.

2. The apparatus as described in claim 1, wherein:

said bores are disposed in substantially parallel relationship.

3. The apparatus as described in claim 2, wherein:

each of said first axial extremities is dimensioned and configured to provide space for a filler material between one or more electrical conductors disposed in said first axial extremity of said bore and the wall of the first axial extremity, said means for locking including a filler material disposed in each of said spaces.

4. The apparatus as described in claim 3, wherein:

each of said axial sections at respective first axial extremities is a counterbore.

5. The apparatus as described in claim 4, wherein:

each of said bores includes a chamfer at a second axial extremity thereof opposite to the first axial extremity at which said counterbore is disposed.

6. The apparatus as described in claim 5, wherein:

said body has an outer contour that is cylindrically section shaped.

7. The apparatus as described in claim 6, further including:

a lip shaped member extending axially from said generally cylindrical body.

8. The method of assembling an assembly having first and second sets of wires that are to be secured together and then held respectively apart thereafter which comprises:

providing a first set of wires having at least first and second conductors;

providing a second set of wires having at least first and second conductors;

providing an electrically non-conductive body having at least first and second bores therein, each of said bores having at least axial sections that have non-circular cross-sections;

inserting the first wire from the first set and the first wire from the second set in said axial section of said first bore and inserting a filler material in said axial section of said first bore to secure said first wire of said first set and said first wire of said second set together;

inserting said second wire of said first set and said second wire of said second set in said axial section of said second bore and inserting a filler material in said axial section of said second bore to secure said second wire of said first set and said second wire of said second set together;

installing said first and second sets of conductors and said non-conductive body into a higher assembly.

9. The method as described in claim 8, wherein:

said higher assembly includes an elongated tube.

10. The method as described in claim 9, wherein:

said inserting step includes welding.

11. The method as described in claim 10, wherein:

said inserting step is performed at respective axial extremities of respective bores.

12. Apparatus for holding an electrical conductor which comprises:

a body having a bore extending therein, said bore having at least a first axial section that has a non-circular cross-section, said axial section being at a first axial extremity of said bore, said bore including a space at said first axial section dimensioned and configured to provide space for a weld between electrical conductors disposed in that bore, said apparatus further including a weld in said space.

13. The apparatus as described in claim 12, wherein:

said space at said first axial section is a counterbore.

14. The apparatus as described in claim 13, wherein:

said bore includes a chamfer at the axial extremity thereof opposite to the first axial extremity at which said counterbore is disposed.

15. The apparatus as described in claim 14, wherein:

said body has an outer contour that is cylindrical section shaped.

16. A process which includes:

providing a generally cylindrical electrically non-conductive body having at least a first bore therein and having a lip shaped member extending axially from said generally cylindrical body.

providing a first wire;

providing a second wire;

inserting the first wire and the second wire in the bore and securing said wires together by adding a filler material intermediate said wires and a first axial extremity of said bore; and installing said first and second wires and said non-conductive body into a higher assembly.

17. The method as described in claim 16, wherein:

said higher assembly includes an elongated tube and said installing step includes installing said body into said tube.

18. The method as described in claim 17, wherein:

said securing step includes welding.

19. A temperature probe apparatus which comprises:

a body having at least a first bore extending therein, said bore having at least a first axial section that has a non-circular cross-section; and means for locking an associated electrical conductor with respect to said body in said first axial section of said bore, said first axial section being at a first axial extremity of said bores, said means for locking including a weld in said first axial section.

20. The apparatus as described in claim 19, wherein:

said first axial section is a counter bore.

21. The apparatus as described in claim 12, wherein:

said bore includes a chamfer at the axial extremity thereof opposite to the first axial extremity at which said counter bore is disposed.

22. The apparatus as described in claim 20, wherein:

said body has an outer contour that is cylindrically section shaped.

23. The apparatus as described in claim 21, further including:

a lip shaped member extending axially from said generally cylindrical body.

* * * * *